(12) United States Patent
Makino et al.

(10) Patent No.: US 11,365,758 B2
(45) Date of Patent: Jun. 21, 2022

(54) BOLT

(71) Applicant: MEIDOH CO., LTD., Toyota (JP)

(72) Inventors: Koji Makino, Toyota (JP); Masataka Kondo, Toyota (JP); Shungo Maki, Toyota (JP); Akihiro Futamura, Toyota (JP)

(73) Assignee: MEIDOH CO., LTD., Toyota (JP)

( * ) Notice: Subject to any disclaimer, the term of this patent is extended or adjusted under 35 U.S.C. 154(b) by 204 days.

(21) Appl. No.: 16/468,780

(22) PCT Filed: Nov. 30, 2017

(86) PCT No.: PCT/JP2017/043181
§ 371 (c)(1),
(2) Date: Jun. 12, 2019

(87) PCT Pub. No.: WO2018/173374
PCT Pub. Date: Sep. 27, 2018

(65) Prior Publication Data
US 2019/0309788 A1  Oct. 10, 2019

(30) Foreign Application Priority Data
Mar. 23, 2017  (JP) .............................. JP2017-077822

(51) Int. Cl.
*F16B 35/00* (2006.01)
(52) U.S. Cl.
CPC .................................. *F16B 35/007* (2013.01)
(58) Field of Classification Search
CPC ..... F16B 35/047; F16B 35/007; F16B 35/044

USPC .......................................................... 411/386
See application file for complete search history.

(56) References Cited

U.S. PATENT DOCUMENTS

| 2,165,011 A | * | 7/1939 | Rosenberg | .......... F16B 25/0021 |
| | | | | 411/420 |
| 2,251,495 A | * | 8/1941 | Owen | ................... F16B 35/044 |
| | | | | 411/378 |
| 2,292,195 A | * | 8/1942 | Brown | ................ F16B 25/0021 |
| | | | | 411/386 |

(Continued)

FOREIGN PATENT DOCUMENTS

| DE | 10 2007 056 655 A1 | 5/2009 |
| EP | 1 087 149 A2 | 3/2001 |

(Continued)

OTHER PUBLICATIONS

Extended European Search Report dated Dec. 7, 2020 in corresponding European Patent Application No. 17901980.7 citing documents AA, AO-AT therein, 7 pages.

(Continued)

*Primary Examiner* — Flemming Saether
(74) *Attorney, Agent, or Firm* — Oblon, McClelland, Maier & Neustadt, L.L.P.

(57) ABSTRACT

The objective is to provide a bolt which can more effectively suppress occurrence of seizure due to both oblique insertion and biting of foreign substances. The bolt includes a tapered surface, a guide portion, and a threaded portion in order from a distal end side and further includes a plurality of recesses provided on the tapered surface and a plurality of cutout portions provided at a distal end portion of the threaded portion.

11 Claims, 4 Drawing Sheets

(56) References Cited

U.S. PATENT DOCUMENTS

| | | | | |
|---|---|---|---|---|
| 2,823,574 | A * | 2/1958 | Rosan | F16B 25/0078 411/386 |
| 3,079,831 | A | 3/1963 | Gutshall | |
| 3,125,923 | A * | 3/1964 | Hanneman | F16B 25/0021 411/386 |
| 3,358,548 | A * | 12/1967 | Dyslin | F16B 25/0057 411/387.2 |
| 3,507,183 | A * | 4/1970 | Thurston | F16B 25/0021 411/387.2 |
| 4,915,560 | A * | 4/1990 | Peterson | F16B 35/047 411/378 |
| 4,978,350 | A * | 12/1990 | Wagenknecht | A61B 17/8635 411/387.7 |
| 5,000,639 | A * | 3/1991 | Hinkley | F16B 25/0021 411/386 |
| 5,374,146 | A * | 12/1994 | Allen | B21H 3/027 411/386 |
| 5,499,895 | A * | 3/1996 | Allen | B21H 3/027 411/386 |
| 6,062,786 | A * | 5/2000 | Garver | F16B 35/047 411/386 |
| 6,296,432 | B1 * | 10/2001 | Kato | F16B 35/044 411/386 |
| 6,347,917 | B1 * | 2/2002 | Kato | B21K 1/56 411/308 |
| 6,540,619 | B2 | 4/2003 | Kato | |
| 6,878,069 | B2 | 4/2005 | Swim, Jr. | |
| 6,908,270 | B1 * | 6/2005 | Iwata | F16B 35/047 411/188 |
| 7,108,607 | B2 | 9/2006 | Swim, Jr. | |
| 8,197,170 | B2 * | 6/2012 | Wagner | F16B 35/047 411/386 |
| 8,998,549 | B2 * | 4/2015 | Pimper | F16B 35/047 411/171 |
| 9,644,665 | B2 * | 5/2017 | Garver | F16B 35/047 |
| 10,267,348 | B2 * | 4/2019 | Hiroi | F16B 35/00 |
| 2002/0042302 | A1 | 4/2002 | Kato | |
| 2003/0185649 | A1 | 10/2003 | Mizuno et al. | |
| 2004/0245772 | A1 | 12/2004 | Swim, Jr. | |
| 2005/0129485 | A1 | 6/2005 | Swim, Jr. | |
| 2005/0135897 | A1 | 6/2005 | Swim, Jr. | |
| 2009/0035091 | A1 * | 2/2009 | Geist | F16B 35/007 411/387.4 |
| 2016/0186795 | A1 * | 6/2016 | Schneider | F16B 25/0021 411/386 |
| 2016/0281763 | A1 | 9/2016 | Garver | |
| 2017/0016467 | A1 | 1/2017 | Wang | |

FOREIGN PATENT DOCUMENTS

| | | |
|---|---|---|
| EP | 1 087 149 A3 | 3/2001 |
| EP | 1 484 516 A1 | 12/2004 |
| FR | 1 338 832 A | 9/1963 |
| JP | 51-141953 A | 12/1976 |
| JP | 2000-329125 A | 11/2000 |
| JP | 2003-278729 A | 10/2003 |
| JP | 2004-44767 A | 2/2004 |
| JP | 2004-116771 A | 4/2004 |
| JP | 2005-30576 A | 2/2005 |
| TW | M446239 U1 | 2/2013 |
| WO | WO 85/05415 A1 | 12/1985 |

OTHER PUBLICATIONS

International Search Report dated Jan. 30, 2018 in PCT/JP2017/043181 filed on Nov. 30, 2017.

* cited by examiner

BOLT

TECHNICAL FIELD

The present invention relates to a bolt used for various fastenings for automobiles and the like.

BACKGROUND ART

In the prior art, when a bolt is tightened against an internal thread such as a nut, seizure due to oblique insertion may occur. As a countermeasure against this problem, for example, a bolt as disclosed in Patent Literature 1 has been devised and used. According to the bolt of Patent Literature 1, a starting end portion of a complete ridge of a threaded portion provided at a shank is provided in a cutout shape in which with a crest of a distal end ridge as the boundary, while the outside bends forward, the inside bends backward, and the starting end portion of the complete ridge provided in the cutout shape catches an internal thread to correct the attitude of the bolt, whereby it is possible to prevent occurrence of seizure due to oblique insertion.

Other than the above, examples of a cause of seizure at the site of fastening work include a thick film formed by painting applied to an internal thread and foreign substances such as spatters generated during welding. According to a bolt of Patent Literature 2, a plurality of cutout shapes are provided at a bolt thread distal end portion, and the bolt is tightened while foreign substances are removed by the cutout shapes, whereby it is possible to suppress occurrence of seizure due to biting of foreign substances. In addition, in the bolt of Patent Literature 2, a shape of an entrance of a screw thread is devised to make the entrance wider than that of a general bolt and thus to make it easier to catch an internal thread, whereby an attempt is made to suppress occurrence of seizure due to oblique insertion.

CITATIONS LIST

Patent Literatures

Patent Literature 1: JP-A-2004-116771
Patent Literature 2: JP-A-2004-044767

SUMMARY OF INVENTION

Technical Problems

In the bolt of Patent Literature 1, occurrence of seizure due to biting of foreign substances cannot be suppressed. On the other hand, in the bolt of Patent Literature 2, the effect of suppressing occurrence of seizure due to oblique insertion is insufficient. In addition, in the bolt of Patent Literature 2, since the removal performance against relatively large foreign substances such as spatters is insufficient even for seizure due to biting of foreign substances, the effect of suppressing occurrence of seizure is insufficient.

The present invention has been made to solve the above-described problems, and it is an object of the present invention to provide a bolt which can more effectively suppress occurrence of seizures due to both oblique insertion and biting of foreign substances.

Solutions to Problems in order to solve the above problem, the invention according to claim 1 is a bolt including a tapered surface, a guide portion, and a threaded portion in order from a distal end side. This bolt further includes a plurality of recesses provided on the tapered surface and a plurality of cutout portions provided at a distal end portion of the threaded portion.

In the invention according to claim 2, according to the invention according to claim 1, the guide portion exists on the extension of a same helix as a thread root of the threaded portion and is formed between a groove portion formed at a distal end portion of the threaded portion so that a depth in a radial direction is deeper than the thread root and a surface end position on a base end side of the tapered surface, the guide portion has a shape extending in a direction around an axis of the bolt from a starting end portion to a terminal end portion and expanding in an axial direction of the bolt in transition from the starting end portion to the terminal end portion, the starting end portion being an intersection between the surface end position on the base end side of the tapered surface and a helix according to the groove portion, a diameter of the guide portion is smaller than a minor diameter of the internal thread corresponding to the bolt and larger than a diameter of the thread root of the bolt, the guide portion and the threaded portion are continuously formed such that the distal end portion of the threaded portion overlaps with the terminal end portion of the guide portion, and in a region of the guide portion, an angle in the direction around the axis of the bolt from the starting end portion is in the range of 90° to 360°.

In the invention according to claim 3, according to the invention according to claim 1 or 2, in the tapered surface, an angle with respect to an axis of the bolt is in the range of 15° to 45°, and a diameter at a distal end of the bolt is 0.7 to 0.9 times a nominal diameter of the bolt.

In the invention according to claim 4, according to the invention according to any one of claims 1 to 3, in the distal end portion of the threaded portion, a ridge has a complete height when the angle in the direction around the axis of the bolt is in the range of 30° to 180°.

In the invention according to claim 5, according to the invention according to any one of claims 1 to 4, a radial dimension of the bolt in the guide portion with reference to a bottom of the groove portion is 0.4 to 0.6 times the height of the ridge in the threaded portion with reference to a bottom of the thread root of the bolt.

In the invention according to claim 6, according to the invention according to any one of claims 1 to 5, the recesses are provided at two to eight positions in the direction around the axis of the bolt, each of the recesses has a depth of 0.2 to 1 mm, and a width in a tangential direction in the range of 20% to 30% with respect to the nominal diameter of the bolt.

In the invention according to claim 7, according to the invention according to any one of claims 1 to 6, the cutout portions are provided at two to eight positions in the direction around the axis of the bolt in the range of 1 to 5 pitches in the axial direction of the bolt, a range of an angle of each of the cutout portions with respect to the axis of the bolt is ±15° to 80°, and a width of each of the cutout portions in a circumferential direction of a thread major diameter circle is 2% to 10% with respect to the nominal diameter of the bolt.

Advantageous Effects of Invention

Function

According to the present invention, occurrence of seizure due to oblique insertion can be more effectively suppressed by the function of correcting the attitude of the bolt by the guide portion and the function of idling without forcibly trying to correct the attitude when the bolt tilts largely. When the bolt is fastened, the recess on the tapered surface can remove relatively large foreign substances such as spatters deposited on the inside of the internal thread, and the cutout portion of the distal end portion of the threaded portion can remove a coated thick film deposited on the inside of the internal thread. As described above, since the bolt can be tightened while foreign substances such as spatters and a coated thick film are removed by the recess and the cutout portion, it is possible to more effectively suppress occurrence of seizure due to biting of foreign substances.

The guide portion is formed between a groove portion formed at the distal end portion of the threaded portion and a surface end position on the base end side of the tapered surface. When the intersection between the surface end position on the base end side of the tapered surface and the helix according to the groove portion is the starting end portion, the guide portion can have a shape extending in the direction around the axis of the bolt from the starting end portion to the terminal end portion and expanding in the axial direction of the bolt in transition from the starting end portion to the terminal end portion. The diameter of the guide portion can be made smaller than the minor diameter of the internal thread corresponding to the bolt and larger than the diameter of the thread root of the bolt. The distal end portion of the threaded portion overlaps with the terminal end portion of the guide portion, so that the guide portion and the threaded portion can be continuously formed. In the region of the guide portion, the angle in the direction around the axis of the bolt from the starting end portion can be set in the range of 90° to 360°. When the guide portion is thus configured, the starting end portion of the guide portion is positionally deviated from the extension of a helix passing through the crest of the ridge of the threaded portion toward the base end. For this reason, when the tilt of the bolt with respect to the internal thread is large, the guide portion does not forcibly catch the internal thread, and the function of idling without forcibly trying to correct the attitude is suitably exerted, and occurrence of seizure due to oblique insertion can be suppressed well.

In the case where, in the tapered surface, the angle with respect to the axis of the bolt is in the range of 15° to 45°, and the diameter at the distal end of the bolt is 0.7 to 0.9 times the nominal diameter of the bolt, it is possible to prevent interference between the distal end portion of the bolt and an entrance of the internal thread corresponding to the bolt.

In the distal end portion of the threaded portion, in the case where the ridge has a complete height when the angle in the direction around the axis of the bolt is in the range of 30° to 180°, the ridge has the complete height at an earlier stage than a general external thread, so that it can make it easier to correct deviation of the axis from the internal thread.

In the case where the radial dimension of the bolt in the guide portion with reference to the bottom of the groove portion is 0.4 to 0.6 times the height of the ridge in the threaded portion with reference to the bottom of the thread root of the bolt, when the tilt of the bolt with respect to the internal thread is large, the function of idling without forcibly trying to correct the attitude can be exerted well.

In the case where the recesses are provided at two to eight positions in the direction around the axis of the bolt, the depth of the recess is 0.2 to 1 mm, and the width in the tangential direction is in the range of 20% to 30% with respect to the nominal diameter of the bolt, when the bolt is fastened, relatively large foreign substances such as spatters deposited on the inside of the internal thread corresponding to the bolt can be removed well.

In the case where the cutout portions are provided at two to eight positions in the direction around the axis of the bolt in the range of 1 to 5 pitches in the axial direction of the bolt, the range of the angle of the cutout portion with respect to the axis of the bolt is ±15° to 80°, and the width of the cutout portion in the circumferential direction of the thread major diameter circle is 2% to 10% with respect to the nominal diameter of the bolt, when the bolt is fastened, a coated thick film deposited on the inside of the internal thread corresponding to the bolt can be removed well.

Effect

According to the present invention, it is possible to provide a bolt which can more effectively suppress occurrence of seizures due to both oblique insertion and biting of foreign substances.

DESCRIPTION OF EMBODIMENT

An embodiment of the present invention will be described below.

Figure 1:
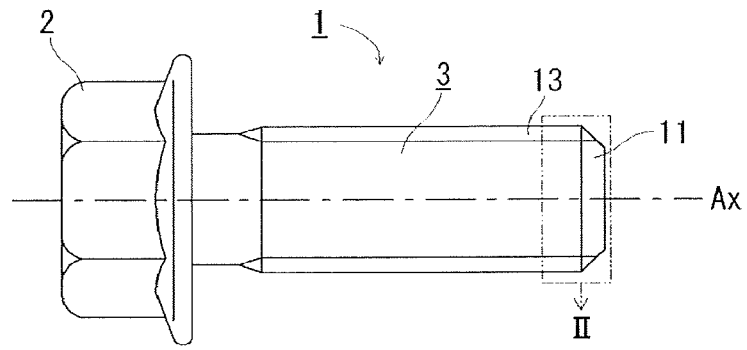
FIG. 1 is a schematic view of a bolt of the present embodiment.
Figure 2:
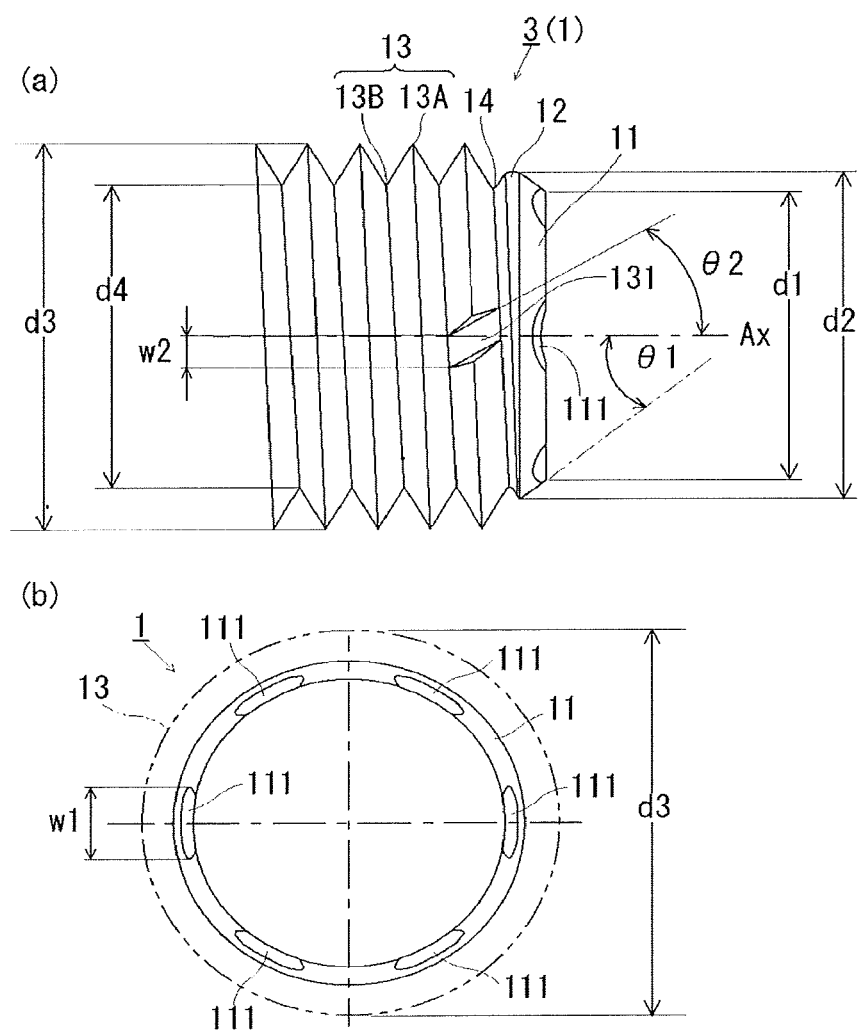
FIG. 2(a) is an enlarged view of a portion II in FIG. 1.
FIG. 2(b) is a view showing a tapered surface in the bolt of the present embodiment.

As shown in FIG. 1, a bolt 1 of the present embodiment includes a head 2 and a shank 3 arranged on a same axis Ax. As shown in FIG. 2(a), the bolt 1 includes, at a distal end portion of the shank 3, a tapered surface 11, a guide portion 12, and a threaded portion 13 having a ridge 13A and a thread root 13B in order from the distal end side.

In the following description, a base end side refers to the head 2 side of the bolt 1 in the direction of the axis Ax, and a distal end side refers to the shank 3 side of the bolt 1 in the direction of the axis Ax. In addition, a circumferential direction refers to a direction around the axis of the bolt 1, and a radial direction refers to a radial direction of the bolt 1.

As shown in FIGS. 2(a) and (b), the tapered surface 11 is formed so as to have a smaller diameter toward the distal end side.

In the tapered surface 11, an angle θ1 of the bolt 1 with respect to the axis Ax is desirably set in the range of 15° to 45°. Further, in the tapered surface 11, a diameter d1 at the distal end of the bolt 1 is desirably set to 0.7 to 0.9 times a nominal diameter d3 of the bolt 1.

In the tapered surface 11 thus set, it is possible to prevent interference between the distal end of the bolt 1 and an entrance of the internal thread.

On the tapered surface 11, a plurality of recesses 111 are provided.

It is desirable to provide the recesses 111 at two to eight positions in the circumferential direction. In the present embodiment, the recesses 111 are provided at six positions. An interval between the recesses 111 in the circumferential direction is not particularly limited, and is usually set to be equal intervals.

It is desirable that the depth of the recess 111 with respect to the tapered surface 11 be in the range of 0.2 to 1 mm.

A width w1 of the recess 111 in a tangential direction is desirably in the range of 20% to 30% with respect to the nominal diameter d3 of the bolt 1.

The recess 111 thus set makes it possible to remove relatively large foreign substances such as spatters deposited on the inside of the internal thread corresponding to the bolt 1 when fastening the bolt 1.

Figure 4:
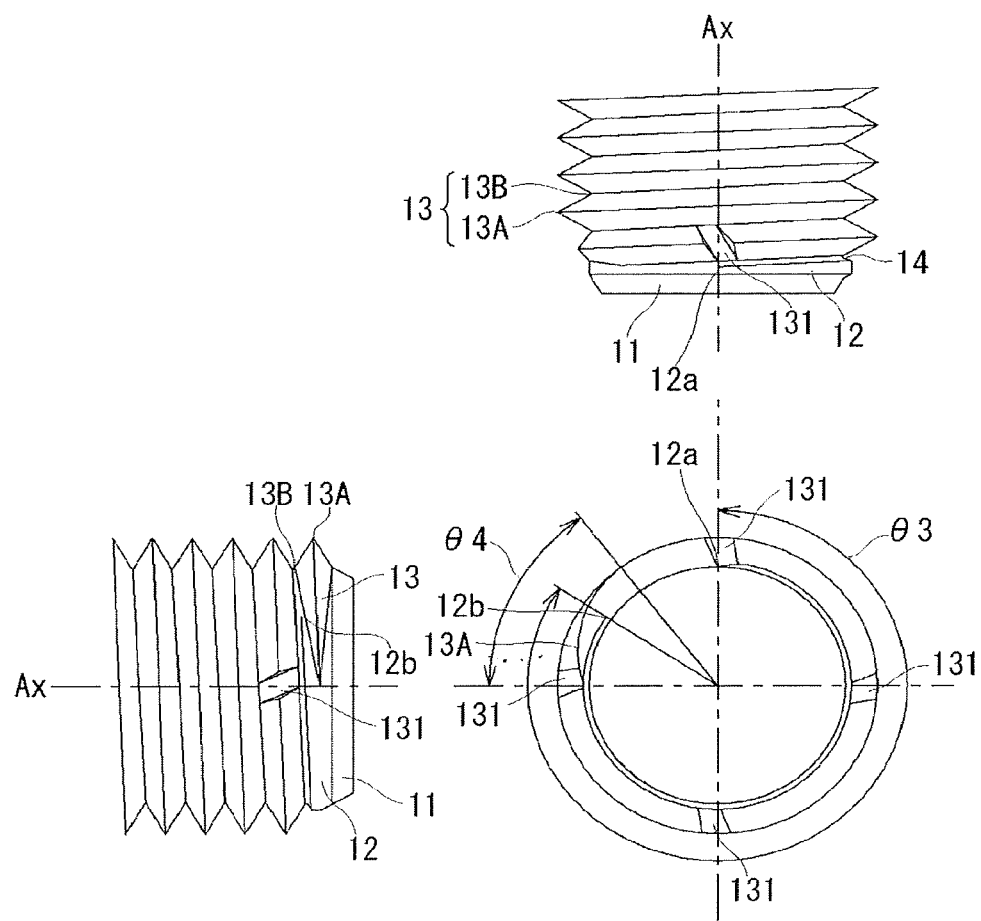
FIG. 4 is a view showing a positional relationship between a guide portion, a threaded portion, and a cutout portion in the bolt of the present embodiment.

As shown in FIGS. 2(a) and 4, a plurality of cutout portions 131 are provided at a distal end portion of the threaded portion 13. In FIG. 4, in order to reduce the complexity of appearance, the recess 111 is omitted.

It is desirable that the cutout portions 131 be provided at two to eight positions in the circumferential direction in the range of 1 to 5 pitches in the direction of the axis Ax of the bolt 1. In the present embodiment, the cutout portions 131 are provided at four positions in the circumferential direction in the range of 1 pitch in the direction of the axis Ax of the bolt 1. An interval between the cutout portions 131 in the circumferential direction is not particularly limited, and is usually set to be equal intervals.

It is desirable that an angle θ2 of the cutout portion 131 with respect to the axis Ax of the bolt 1 be in the range of ±15° to 80°.

A width w2 of the cutout portion 131 in the circumferential direction of a thread major diameter circle is desirably 2% to 10% with respect to the nominal diameter d3 of the bolt 1.

The cutout portion 131 thus set makes it possible to remove a thick film (hereinafter also referred to as "coated thick film" for short) formed by painting applied to the internal thread when fastening the bolt 1 and makes it possible to minimize a reduction in tensile strength of the bolt 1.

Figure 3:
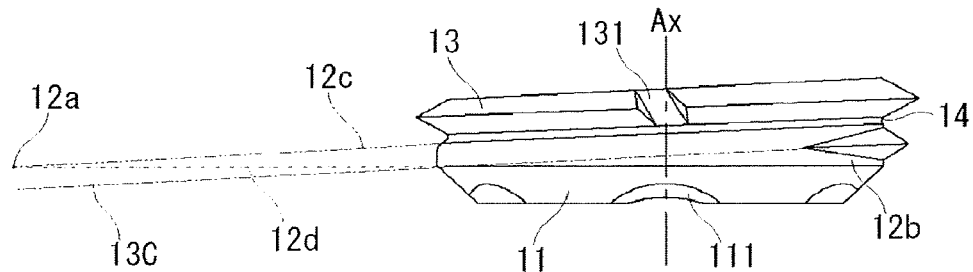
FIG. 3 is a view showing the vicinity of a rising edge of a threaded portion in the bolt of the present embodiment.

As shown in FIGS. 2(a) and 3, a groove portion 14 is formed at the distal end portion of the threaded portion 13 such that the depth in the radial direction is slightly deeper than that of the thread root 13B of the threaded portion 13.

The guide portion 12 is formed between the groove portion 14 and a surface end position on the base end side of the tapered surface 11.

FIG. 3 shows the guide portion 12 developed in a plane. The guide portion 12 is formed between a line 12c showing a helix according to the groove portion 14 and a line 12d showing the surface end position on the base end side of the tapered surface 11. A starting end portion 12a of the guide portion 12 is provided at an intersection between the line 12c (helix according to the groove portion 14) and the line 12d (surface end position on the base end side of the tapered surface 11). A terminal end portion 12b of the guide portion 12 is provided at a position extending clockwise from the starting end portion 12a in the circumferential direction. The guide portion 12 has a shape in which the guide portion 12 expands toward the base end side in transition from the starting end portion 12a to the terminal end portion 12b.

Figure 5:
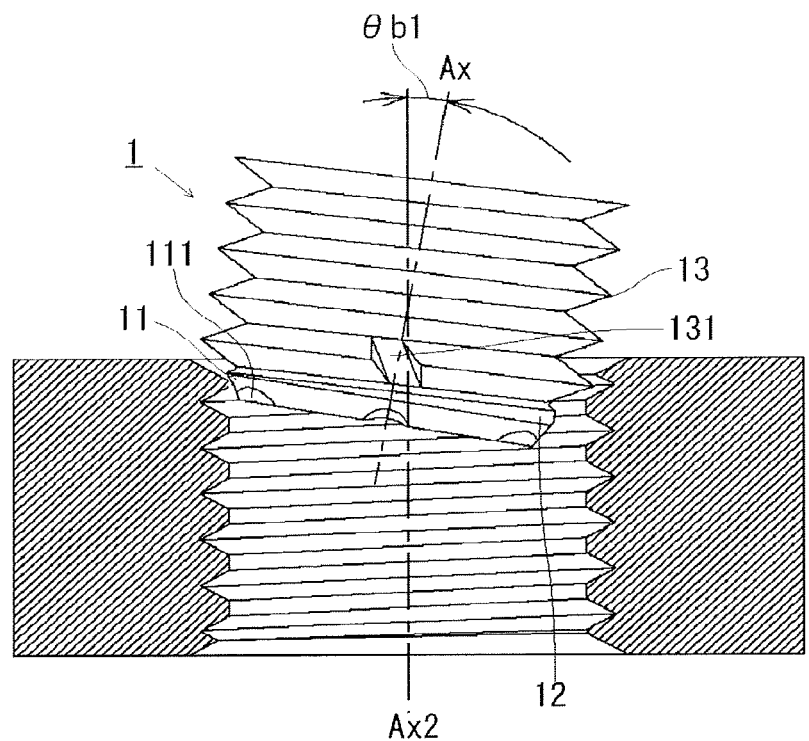
FIG. 5 is a view showing a state in which a tilt angle of the bolt of the present embodiment with respect to an axis of an internal thread is larger than an attitude correction limit.

By setting in this manner, the starting end portion 12a of the guide portion 12 is located toward the base end to be deviated from the extension of a helix 13C passing through the crest of the ridge 13A of the threaded portion 13. Consequently, as shown in FIG. 5, in a case where the bolt 1 is inserted in a state in which the axis Ax of the bolt 1 tilts with respect to the axis Ax2 of the internal thread and the bolt 1 is to be tightened, when a tilt angle θb1 of the bolt 1 is larger than an attitude correction limit, the guide portion 12 does not forcibly catch the internal thread, and the bolt 1 easily idles, so that it is possible to suppress occurrence of seizure due to oblique insertion.

As shown in FIG. 2(a), the groove portion 14 exists on the extension of the same helix as the thread root 13B of the threaded portion 13. The height (radial dimension) of the guide portion 12 with reference to a bottom of the groove portion 14 is desirably 0.4 to 0.6 times the height of the ridge 13A with reference to a bottom of the thread root 13B.

A diameter d2 of the guide portion 12 is slightly smaller than the minor diameter of the internal thread corresponding to the bolt 1 and slightly larger than a diameter d4 of the thread root 13B of the bolt 1. Since the bolt 1 having the guide portion 12 thus set can be prevented from entering an internal thread hole too much when inserted in a state where the bolt 1 tilts with respect to the axis of the internal thread, it is possible to reduce the probability of occurrence of biting by the bolt 1 due to pitch deviation between an external thread and the internal thread.

As shown in FIG. 4, a region of the guide portion 12 is in a range of an angle θ3 in the circumferential direction between the starting end portion 12a and the terminal end portion 12b. At the distal end portion of the threaded portion 13, a starting end portion of the ridge 13A overlaps with the terminal end portion 12b of the guide portion 12, and the guide portion 12 and the threaded portion 13 are continuously formed.

In view of the structure of the bolt 1, the circumferential angle θ3 indicating the region of the guide portion 12 is necessarily 90° to 360°.

At the distal end portion of the threaded portion 13, the height of the ridge 13A gradually increases in the circumferential direction from the starting end, and the ridge 13A reaches the complete height (the same height as the other ridges 13A) at an angle θ4 (hereinafter referred to as "rising angle θ4") in the circumferential direction. The value of the rising angle θ4 is desirably 30° to 180°.

The value of the rising angle θ4 of a general external thread is 360° or more. That is, the threaded portion 13 is set so that the ridge 13A has the complete height at an earlier stage than a general external thread. By setting in this manner, it is possible to make a force for correcting deviation of the axis between the bolt and the internal thread in the bolt 1 larger than the general external thread.

FIG. 5 shows a case where the tilt angle θb1 of the axis Ax of the bolt 1 with respect to the axis Ax2 of the internal thread is larger than the attitude correction limit. In this case, the guide portion 12 does not come into contact with the internal thread, and since the starting end portion 12a of the guide portion 12 is positionally deviated from the extension of the helix 13C passing though the crest of the ridge 13A toward the base end, the guide portion 12 does not forcibly catch the internal thread. The distal end portion of the threaded portion 13 is formed so as to overlap with the terminal end portion 12b of the guide portion 12. Thus, unless the guide portion 12 forcibly catches the internal thread, the probability that the threaded portion 13 of the bolt 1 meshes with the internal thread with their pitches shifted from each other is small, and the bolt 1 is liable to idle, so that the probability of occurrence of seizure is small.

Figure 6:
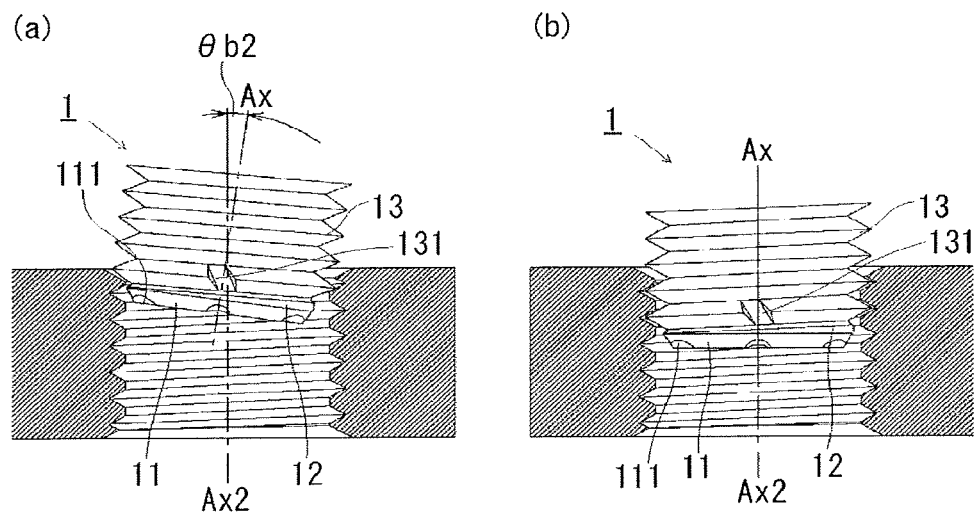
FIG. 6(a) is a view showing a state in which the bolt tilts in a state in which the tilt angle of the bolt of the present embodiment with respect to the axis of the internal thread is smaller than the attitude correction limit.
FIG. 6(b) is a view showing a state in which the tilt is corrected in the state in which the tilt angle of the bolt of the present embodiment with respect to the axis of the internal thread is smaller than the attitude correction limit.

FIG. 6(a) shows a case where a tilt angle θb2 of the axis Ax of the bolt 1 with respect to the axis Ax2 of the internal thread is smaller than the attitude correction limit. In this case, the guide portion 12 comes into contact with the internal thread to enter a state where the internal thread can be caught. When an attempt is made to tighten the bolt 1 in this state, the internal thread is guided from the terminal end portion 12b of the guide portion 12 to the starting end portion of the threaded portion 13, and as shown in FIG. 6(h), the attitude of the bolt 1 is corrected so that the pitch of the threaded portion 13 is matched with the pitch of the internal thread, so that normal fastening can be performed.

The attitude correction limit value is set to be preferably less than 10°, more preferably 8° or less, still more preferably 6° or less. When the attitude correction limit value is 10° or more, the incidence of seizure increases.

Figure 7:
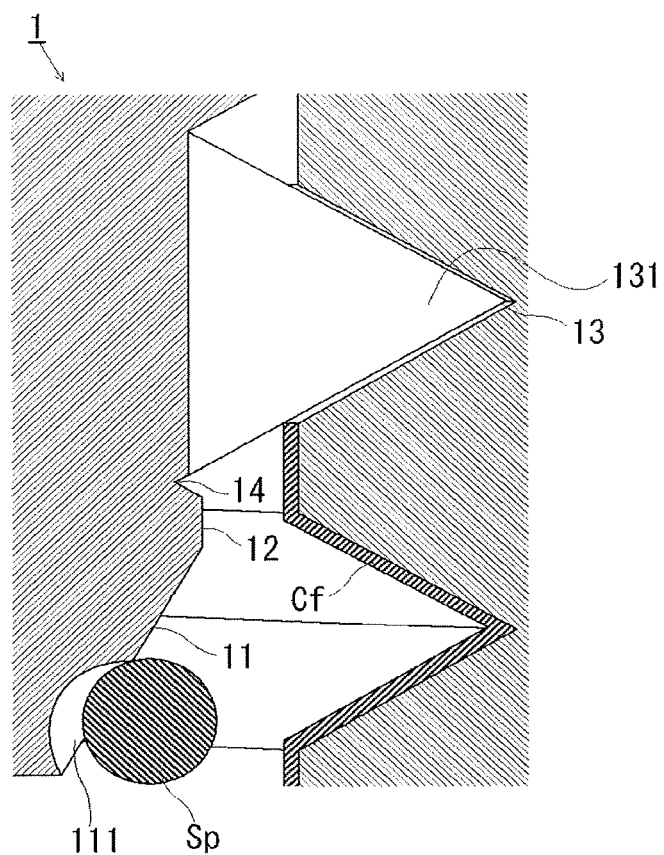
FIG. 7 is a view showing a state in which foreign substances are removed when the bolt of the present embodiment is fastened.

When the bolt 1 can be normally fastened without idling, as shown in FIG. 7, the recess 111 on the tapered surface 11 is caught in the bolt 1 in a rotating state during fastening to peel a spatter Sp which is a relatively large foreign substance deposited on the inside of the internal thread, or the spatter Sp is impacted by repeated contacts with the recesses 111 to be removed.

A coated thick film Cf formed inside the internal thread is removed by being scraped with the cutout portion 131 of the threaded portions 13 in the bolt 1 in the rotating state during fastening.

As described above, foreign substances such as the spatter Sp and the coated thick film Cf are removed from the inside of the internal thread by the recess 111 and the cutout portions 131. As a result, biting of foreign substances between the bolt 1 and the internal thread during fastening is prevented, so that occurrence of seizure is suppressed.

Since the main point of the present invention lies in a shape near the distal end of the bolt, although the shape of a head of the bolt is not particularly limited and is a hexagonal prism shape in FIG. 1, the shape of the head may be, for example, a round head with a hexagon socket, a cylindrical shape, an inverted truncated cone shape, a ring shape, a butterfly shape, or the like. Alternatively, the head 2 may be omitted, and the bolt 1 may be a stud bolt.

The material of the bolt 1 is not particularly limited, and examples thereof include steel, stainless steel, alloy such as aluminum alloy and titanium alloy, synthetic resins, and the like, depending on the application.

REFERENCE SIGNS LIST 1 bolt
11 tapered portion
111 recess
12 guide portion
13 threaded portion
131 cutout portion
14 groove portion

The invention claimed is:

1. A bolt, comprising:
a tapered surface surrounding the bolt;
a guide portion abutting the tapered surface;
a threaded portion in order from a distal end side;
a plurality of recesses provided on a distal most part of the tapered surface; and
a plurality of cutout portions provided at a distal end portion of the threaded portion, wherein
the guide portion is placed between the plurality of recesses and the plurality of cutout portions,
the plurality of recesses and the plurality of cutout portions are separated from each other and from the guide portion, and
a starting end portion of the guide portion is shifted from an extension of a helix passing through a crest of a ridge of the threaded portion toward a base end such that the bolt can spin freely in an internal thread when a tilt angle of an axis of the bolt with respect to an axis of the internal thread is larger than an attitude correction limit.

2. The bolt according to claim 1, wherein
the guide portion exists on extension of a same helix as a thread root of the threaded portion and is formed between a groove portion formed at the distal end portion of the threaded portion and a surface end position on a base end side of the tapered surface,
a depth of the groove portion in a radial direction is deeper than the thread root of the threaded portion,
the guide portion has a shape extending in a direction around the axis of the bolt from the starting end portion to a terminal end portion and expanding in an axial direction of the bolt in transition from the starting end portion to the terminal end portion, the starting end portion being an intersection between the surface end position on the base end side of the tapered surface and a helix according to the groove portion,
a diameter of the guide portion is smaller than a minor diameter of an internal thread corresponding to the bolt and larger than a diameter of the thread root of the bolt,
the guide portion and the threaded portion are continuously formed such that the distal end portion of the threaded portion overlaps with the terminal end portion, and
in a region of the guide portion, an angle in the direction around the axis of the bolt from the starting end portion is in a range of 90° to 360°.

3. The bolt according to claim 2, wherein
in the tapered surface, an angle with respect to the axis of the bolt is in a range of 15° to 45°, and
a diameter at a distal end of the bolt is 0.7 to 0.9 times a nominal diameter of the bolt.

4. The bolt according to claim 3, wherein
the recesses are provided at two to eight positions in the direction around the axis of the bolt, and
each of the recesses has a depth of 0.2 to 1 mm and a width in a direction tangent to the tapered surface in a range of 20% to 30% with respect to the nominal diameter of the bolt.

5. The bolt according to claim 3, wherein
the cutout portions are provided at two to eight positions in the direction around the axis of the bolt in a range of 1 to 5 pitches in the axial direction of the bolt,
a range of an angle of each of the cutout portions with respect to the axis of the bolt is ±15° to 80°, and a width of each of the cutout portions in a circumferential direction of a thread major diameter circle is 2% to 10% with respect to the nominal diameter of the bolt.

6. The bolt according to claim 2, wherein in the distal end portion of the threaded portion, a ridge has a complete height when the angle in the direction around the axis of the bolt is in a range of 30° to 180°.

7. The bolt according to claim 6, wherein a radial dimension of the bolt in the guide portion with reference to a bottom of the groove portion is 0.4 to 0.6 times a height of the ridge in the threaded portion with reference to a bottom of the thread root of the bolt.

8. The bolt according to claim 1, wherein the attitude correction limit is less than 10°.

9. The bolt according to claim 8, wherein the attitude correction limit is less than 8°.

10. The bolt according to claim 9, wherein the attitude correction limit is less than 6°.

11. A bolt, comprising:
a tapered surface;
a guide portion;
a threaded portion in order from a distal end side;
a plurality of recesses provided on a distal most part of the tapered surface; and
a plurality of cutout portions provided at a distal end portion of the threaded portion, wherein
the guide portion exists on extension of a same helix as a thread root of the threaded portion and is formed between a groove portion formed at the distal end portion of the threaded portion and a surface end position on a base end side of the tapered surface,
the guide portion is placed between the plurality of recesses and the plurality of cutout portions,
the plurality of recesses and the plurality of cutout portions are separated from each other and from the guide portion, and
a depth of the groove portion in a radial direction is deeper than the thread root of the threaded portion,
the guide portion has a shape extending in a direction around an axis of the bolt from a starting end portion to a terminal end portion and expanding in an axial direction of the bolt in transition from the starting end portion to the terminal end portion, the starting end portion being an intersection between the surface end position on the base end side of the tapered surface and a helix according to the groove portion, and
the starting end portion of the guide portion is shifted from an extension of a helix passing through a crest of a ridge toward a base end such that the bolt can spin freely in an internal thread when a tilt angle of an axis of the bolt with respect to an axis of the internal thread is larger than an attitude correction limit.

* * * * *